(12) United States Patent
Gruia et al.

(10) Patent No.: US 6,621,901 B1
(45) Date of Patent: Sep. 16, 2003

(54) OPTIMAL DYNAMIC AGENT STATE ASSIGNMENT

(75) Inventors: Ronald F. Gruia, Toronto (CA); Robert W. Lieberman, Unionville (CA)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/459,691

(22) Filed: Dec. 13, 1999

(51) Int. Cl.$^7$ ................................................ H04M 3/00
(52) U.S. Cl. .......................... 379/266.07; 379/265.11; 379/309
(58) Field of Search ................ 379/265.02, 265.11, 379/265.12, 266.01, 266.02, 266.07, 309

(56) References Cited

U.S. PATENT DOCUMENTS

| | | | | |
|---|---|---|---|---|
| 5,425,093 A | * | 6/1995 | Trefzger | 379/266 |
| 6,278,777 B1 | * | 8/2001 | Morley et al. | 379/265 |
| 6,282,283 B1 | * | 8/2001 | Wineberg et al. | 379/265 |

* cited by examiner

Primary Examiner—Creighton Smith
(74) Attorney, Agent, or Firm—Kevin L. Smith

(57) ABSTRACT

The present invention is directed toward determining an optimal mix of agents, subject to a grade of service (GOS) constraint, for handling outbound and inbound calls in a blended call center environment. Optimality is achieved through the ability to capture real time data via a real time interface (RTI) for each skill-set.

23 Claims, 4 Drawing Sheets

OPTIMAL DYNAMIC AGENT STATE ASSIGNMENT

FIELD OF THE INVENTION

The present invention relates to call center management and, more particularly, to optimal dynamic agent state assignment.

BACKGROUND OF THE INVENTION

A call center is a common interface between a commercial interest and its customers. A toll-free telephone number is often provided to customers as a source of such services as product information and technical support. Agents are hired to receive incoming calls and provide the customers that call the toll-free telephone number with a service. Call centers may also be a source of outbound calls. Agents place calls which may, for instance, follow-up the provision of a service, announce new products, schedule a delivery or canvass donations.

Often, the pool of agents is subdivided into sets of agents according to common skills, i.e. language proficiency, possessed by each agent. For instance, a pool of agents may be divided into skill-sets for proficiency in English, French and German. Understandably, some agents may be part of more than one skill-set.

An inbound call at a call center may be directed to an agent in a particular skill-set based on information supplied by a caller. For example, a needed skill-set may be determined through answers to voice response questions. Information about a caller may already be held in a customer database, populated by information received on a product registration form or in previous dealings with the customer and this information may be used instead of, or as well as, information learned via voice response answers.

A blended call center uses one pool of agents as a source of outbound calls and as a resource for receiving inbound calls. It is in the best interest of a call center administrator to minimize waiting time, that is, the length of time a customer spends on hold, waiting for an agent. It is also in the best interest of the call center administrator to minimize the number of paid agents and maximize their use. Unfortunately, these interests are at odds with one another. If all agents are busy either receiving or placing calls, none are available to receive the next inbound call. If all agents are available to receive calls, then they are not being used efficiently. Thus, a balance must be struck.

SUMMARY OF THE INVENTION

The present invention is directed toward determining an optimal mix of agents, subject to a grade of service (GOS) constraint, handling outbound and inbound calls in a blended call center environment. Optimality is achieved through the ability to capture real time data via a real time interface (RTI) for each skill-set.

In accordance with an aspect of the present invention there is provided, at an agent assignment server in communication with a call center, the call center having a pool of agents assigned to an inbound state and a pool of agents assigned to an outbound state, a method of optimizing a size of a pool of agents assigned to a preferred state, here the preferred state is one of inbound state and outbound state, the method including receiving call information from the call center, optimizing, based on the received information, the size of the pool of agents assigned to the preferred state, determining, based on the optimizing, a change in the size of the pool of agents assigned to the preferred state and communicating the change to the call center. In other aspects of the present invention an agent assignment server is provided to carry out this method. In a further aspect of the present invention there is provided a software medium that permits a general purpose computer to carry out this method.

In accordance with another aspect of the present invention there is provided, at an agent assignment server in communication with a call center, a method of initializing the call center including determining a maximum size of a pool of agents to be assigned to an inbound state given a maximum expected call rate and communicating the maximum size of a pool of agents to be assigned to an inbound state to the call center. The method further includes receiving information from the call center, optimizing, based on the received information, an initial size of the pool of agents assigned to the inbound state and communicating the initial size of the pool of agents assigned to the inbound state to the call center.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In the figures which illustrate example embodiments of this invention.

DETAILED DESCRIPTION OF THE PREFERRED EMBODIMENTS

Figure 1:
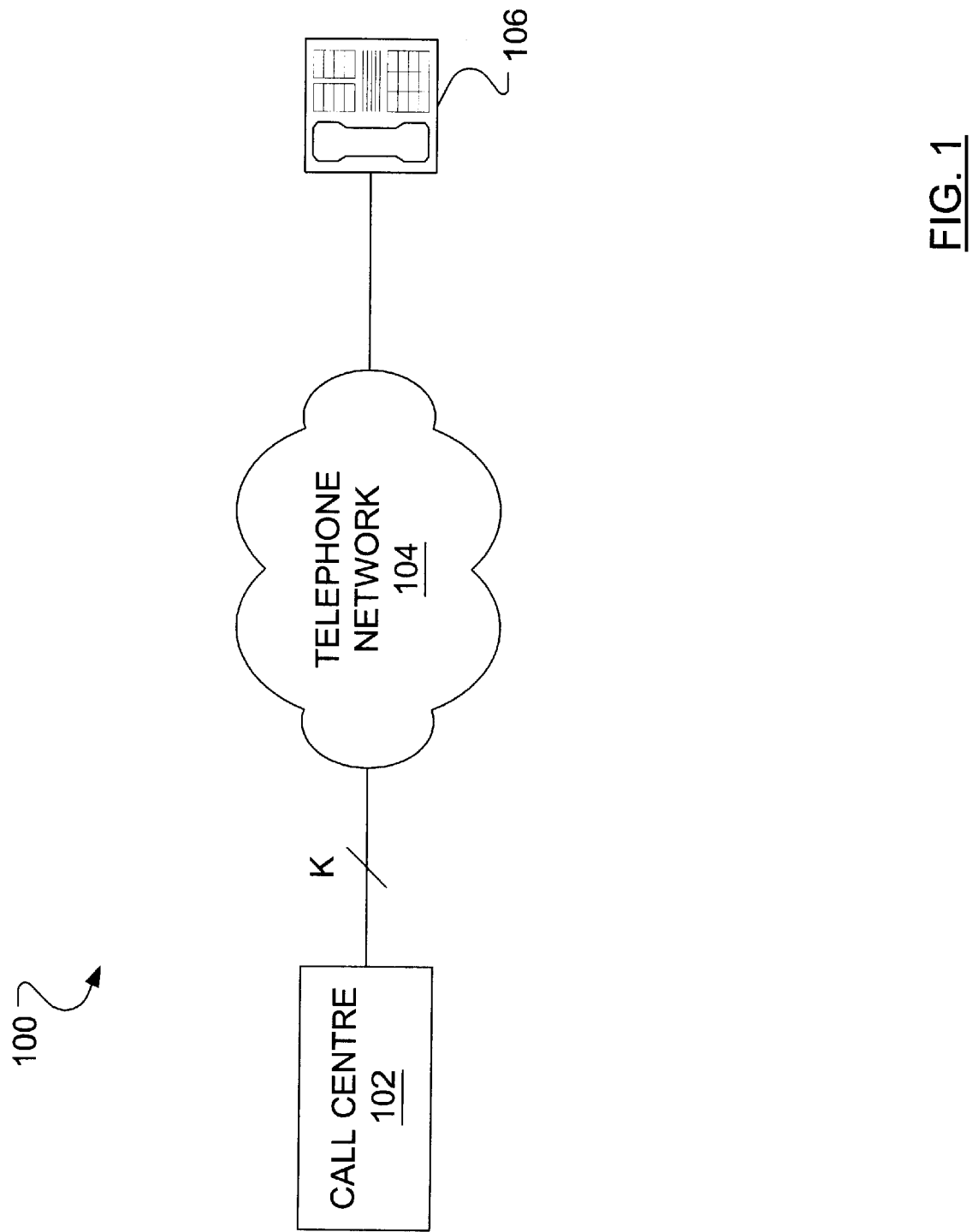
FIG. 1 schematically illustrates a telecommunication system.

FIG. 1 illustrates a telecommunication system 100 comprising a call center 102, for use with this invention, connected to a telephone station apparatus 106 through a telephone network 104 which may be, for instance, a public switched telephone network (PSTN).

Figure 2:
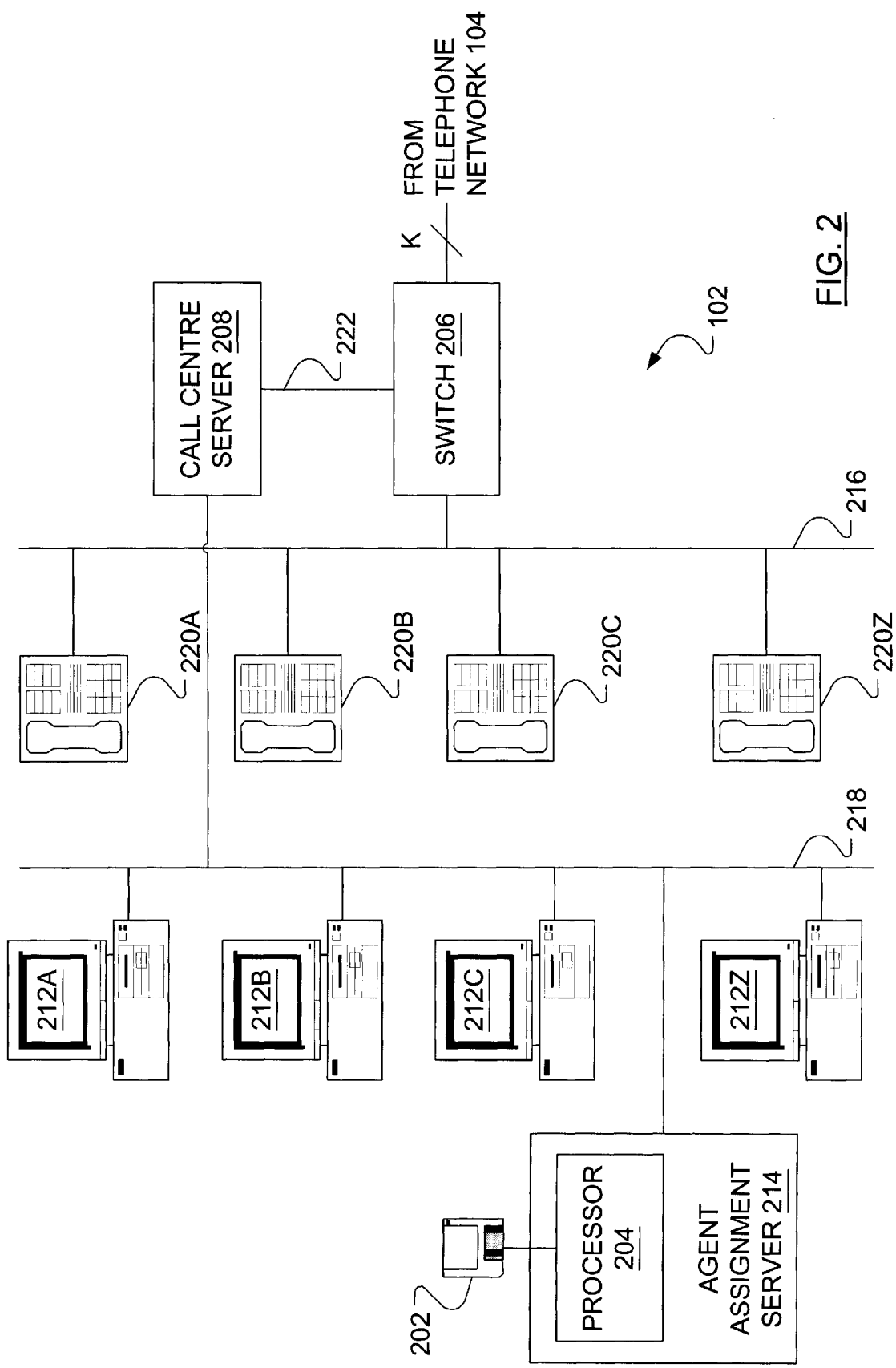
FIG. 2 schematically illustrates a call center.

Call center 102, illustrated in detail in FIG. 2, connects to telephone network 104 (FIG. 1) via K trunk lines. A switch 206 acts as an interface between call center 102 and the K trunk lines. Switch 206 connects through a telephone network 216 to a number of telephone station apparatus 220A, 220B, 220C . . . 220Z, each apparatus associated with an agent. A call center server 208, which may be a Symposium™ Call Center Server (from Nortel Networks Corporation of Montreal, Canada), connects to both to switch 206 and, via a data network 218, to a number of terminals 212A, 212B, 212C . . . 212Z, each terminal associated with an agent. The communication between switch 206 and call center server 208, may take place over a private (embedded) network 222. An agent assignment server 214 is connected to data network 218 for communicating with call center server 208 and terminals 212A, 212B, 212C . . . 212Z. Agent assignment server 214 includes a processor 204 loaded with agent assignment optimizing software for executing the method of this invention from software medium 202. Software medium 202 may be a disk, a tape, a chip or a random access memory containing a file downloaded from a remote source. As will be apparent to a person skilled in the art, telephone network 216 may be a private branch exchange (PBX) and data network 218 may be a local area network (LAN) or a wide area network (WAN), among others. Either network 216, 218, or both, may use the Internet Protocol.

In overview, an agent assignment server 214 may be pre-loaded with a grade of service (GOS) requirement and a maximum expected call arrival rate for each skill-set. An inbound call arrives at call center 102 (FIG. 1) and is assigned, by call center server 208, to an agent in an inbound pool of the appropriate skill-set. The agents in the inbound pool of the appropriate skill-set have been determined by agent assignment server 214 based on an embodiment of the present inventive method. Concurrently, call center server 208 (or another component in call center 102 running agent assignment software) assigns the task of placing outbound calls to agents in outbound pools of particular skill-sets.

Traffic at a call center may be measured in erlangs, where one erlang is an amount of traffic that would keep one agent busy for one hour, that is 3 600 call-seconds. Where R is the call arrival rate (hereinafter referred to as call rate) in calls per hour and D is average call duration in seconds, traffic in erlangs may be calculated as $$T(R, D) = \frac{R \cdot D}{3600}.$$

Where N is the number of available agents, average agent utilization in erlangs per agent, $\rho$, may be calculated as $$\rho(R, D, N) = \frac{T(R, D)}{N}.$$

In some call centers, if an inbound call arrives and all agents are busy, the inbound call is placed in a hold queue. An Erlang B value, B, represents a probability that all agents are busy and may be calculated as $$B(R, D, N) = \frac{1 - \dfrac{\sum_{i=0}^{N-1} \frac{(T(R, D))^i}{i!}}{\sum_{j=0}^{N} \frac{(T(R, D))^j}{j!}}}{1 - \rho(R, D, N) \cdot \dfrac{\sum_{i=0}^{N-1} \frac{(T(R, D))^i}{i!}}{\sum_{j=0}^{N} \frac{(T(R, D))^j}{j!}}}$$

An Erlang C value, P, gives the probability that a waiting time in a queue is at least w seconds and may be calculated as $$P(w, R, D, N) = B(R, D, N) \cdot e^{-\frac{Nw(1-\rho(R,D,N))}{D}}.$$

The calculation of both B(R, D, N) and P(w, R, D, N) assume Poisson arrival rates and Exponential call durations (i.e. calls arrive according to a Poisson Distribution and call durations are distributed according to an exponential distribution). As will be apparent to a person skilled in the art, other mathematical models may be used for call arrival distribution.

In the present invention, known quantities include call rate R, average call handling time D, and grade of service. A grade of service requirement is provided as a probability that an inbound call is in a queue for longer than a specified time, w. To determine the number of inbound agents required to maintain a specified GOS, the Erlang C value, P, is calculated for one agent, then for two agents, then for three agents, etc., until P(w, R, D, N)≦GOS. In this context, GOS is defined as the proportion of calls which have to wait longer than w seconds or the probability that a call will wait longer than w seconds. The first number of inbound agents, N, that meets the requirement is said to be the solution to a function N(w, R, D, GOS).

By way of example, consider a required GOS of a 5% probability that an inbound call is in a queue for longer than six seconds. For a call rate R of 10 000 calls per hour and an average call handling time D of 30 seconds, the required number of inbound agents is N(6, 10 000, 30, 0.05)=92.

Returning to FIG. 2, in operation and for a particular skill-set, agent assignment server 214 may be pre-loaded with a grade of service requirement (GOS, w), an average call handling time (D) and a maximum expected call rate (U). The steps then followed by the agent assignment server are outlined in FIG. 3. A value is determined for a total number of inbound agents $N_U$ necessary to achieve the pre-loaded GOS for the pre-loaded maximum expected call rate, where $N_U$=N(w, U, D, GOS) (step 302). Knowledge of the value of $N_U$ to maintain a GOS for a particular skill-set allows an administrator to appropriately schedule staff for a call center for a given day or shift. N(t)=N(w, R(t), D, GOS) is then determined (step 304), where N(t) is the needed number of inbound agents at time t given R(t), the call rate at time t. Subsequently, a number of outbound agents available for assignment at time t, M(t), is determined (step 306) from M(t)=$N_U$−N(t). After a Δt minute wait (step 308), the call rate is sampled (step 310). The value of Δt is called an "update interval" and is a parameter which may be established for agent assignment server 214. The sampling may take place between agent assignment server 214 and call center server 208 over data network 218 using a Real Time Interface (RTI) available from call center server 208. N(t), the number of inbound agents required to maintain a specified GOS, is re-calculated (step 312) given the sampled call rate R(t+Δt). A change in the number of inbound agents, ΔN(t+Δt), is calculated (step 314) where ΔN(t+Δt)=N(t+Δt)−N(t). A number of agents, equivalent to the magnitude of the calculated change in the number of inbound agents, ΔN(t+Δt), are assigned (step 316) a new state (i.e. outbound agents are assigned to the inbound pool or inbound agents are assigned to the outbound pool, as required).

Figure 3:
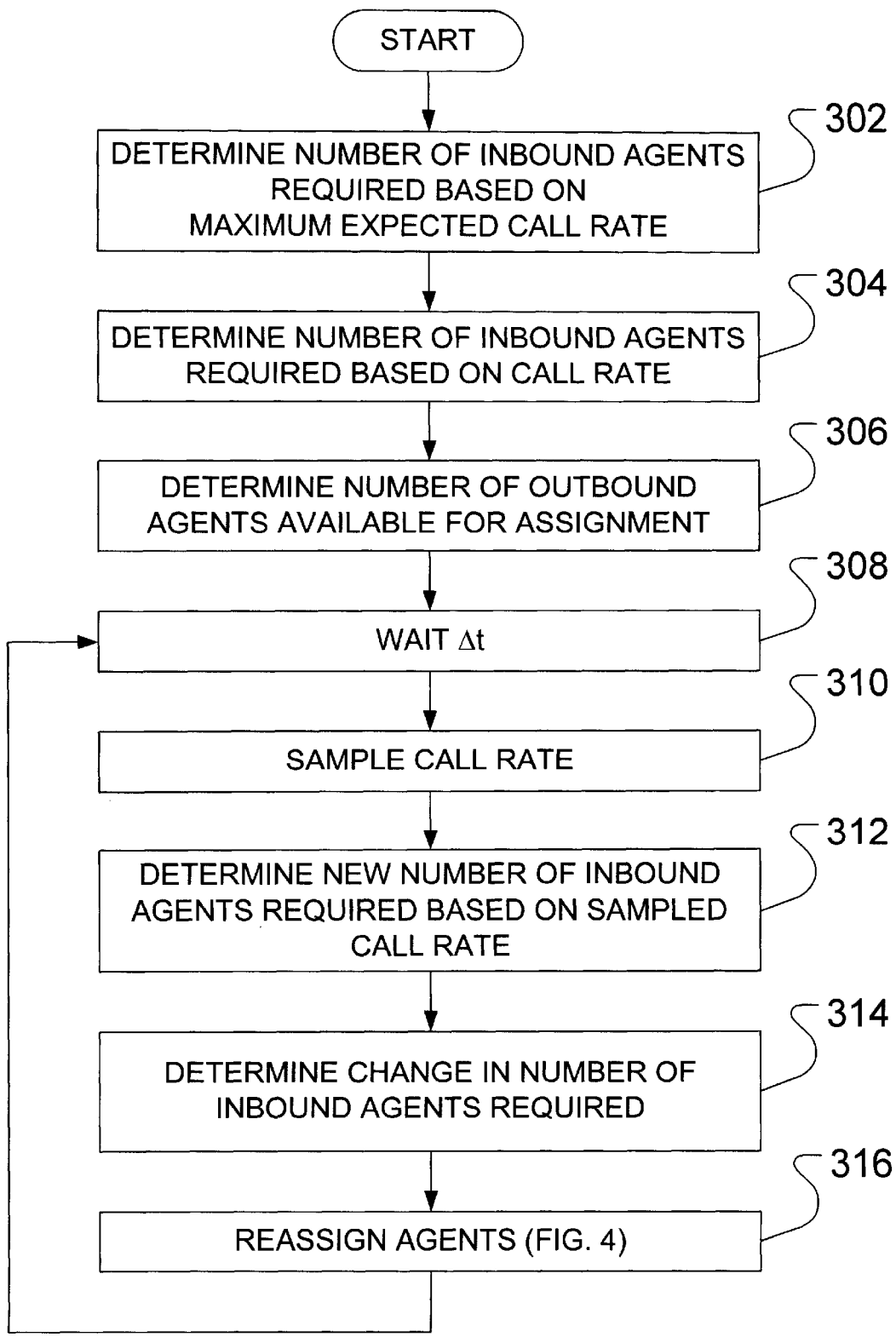
FIG. 3 illustrates, in a flow diagram, method steps followed by a call center in an embodiment of the invention.
Figure 4:
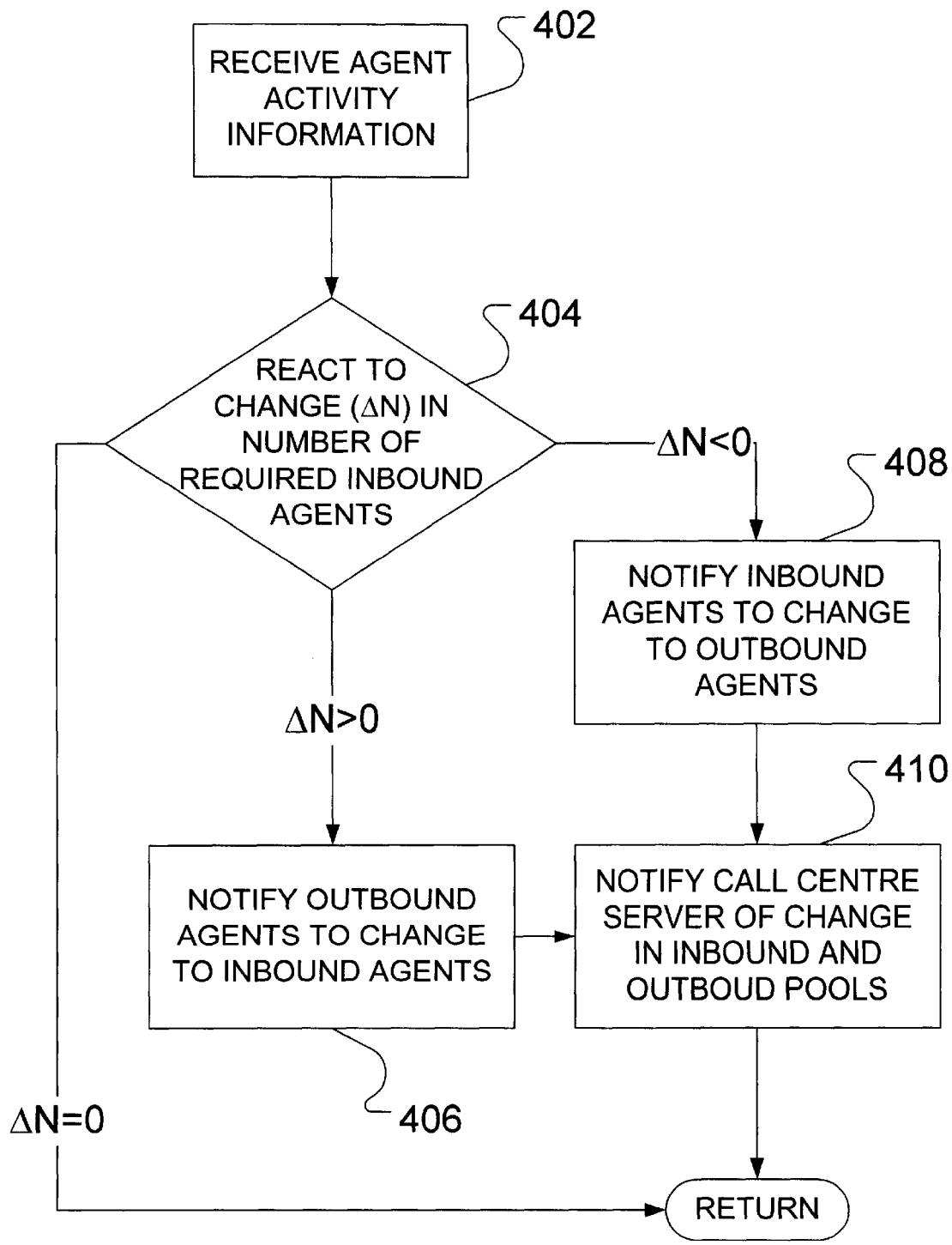
FIG. 4 illustrates, in a flow diagram, method steps followed by a call center in an embodiment of the invention.

Step 316 of FIG. 3 is illustrated in detail in FIG. 4. Before reassignment is performed, agent activity information is received (step 402). The agent activity information relates to the busy or idle status of each agent and allows agent assignment server 214 to determine which agents are presently idle, and thus available for reassignment. The agent assignment server 214 may receive the agent activity information from call center server 208 or other CTI application monitoring the call center activity. ΔN(t+Δt) is tested (step 404). If ΔN(t+Δt)>0, idle outbound agents are notified to change state to inbound (step 406). If ΔN(t+Δt)<0, idle inbound agents are notified to change state to outbound (step 408). If ΔN(t+Δt)=0, no agents are notified to change state. Finally, call center server 208 is notified of the change in inbound and outbound pools (step 410).

In a preferred embodiment, before determining a total number of inbound agents $N_U$, the maximum expected call rate U may be inflated by a buffer, ΔU. Such an inflated maximum expected call rate allows for a sudden burst of calls, that causes the call rate R(t) to exceed the maximum expected call rate U, to be handled with the required grade of service.

As to notifying agents of state change, returning to FIG. 2, notification may be performed via a third party application running on processor 204. Such an application may interface with call center 208 over data network 218 via existing interfaces including the known Telephone Application Programming Interface (TAPI) and Computer-Telephony Integration (CTI) interface. Known notification applications include those which are "screen-pop enabled", that is, an agent is notified of a change in state (inbound to outbound or vice versa) by an information window that pops up on a screen of the agent's terminal 212A under the control of the third party notification application. Terminal 212A may be termed, in this case, a "thin client" in that it does not have any intelligence of its own and need only be provisioned to display messages generated at processor 204.

A scenario may present itself in a blended call center employing the present invention wherein an agent receives a screen pop notifying to switch to outbound state. While this operation is taking place, a certain interval of time elapses. If, during that interval of time, the call center experiences a significant increase in the volume of inbound calls, this agent may then receive a notification to switch to inbound state to assist in handling the extra number of calls. This event would happen in the next update interval. If, during that interval, the agent was not successful in making an outbound call, the state transition from the inbound state to the outbound state may be said to have been unproductive. In addition, there is a loss of agent continuity in the outbound state, where the agent remained for a very short duration. Such a scenario may be acceptable in isolation, but in the event of a quickly varying call rate, several such scenarios in succession may lead to an unacceptable amount of agent idle time. Provisions may be made to limit the number of state changes performed by a particular agent during a given time interval. For instance, if the state assignment of a particular agent is switched from outbound to inbound more than three times in a ten-minute interval, a rule may be invoked such that the agent is assigned to the inbound state for the following ten minutes.

As will be apparent to a person skilled in the art, maximum expected call rate U and, consequently, the total number of required inbound agents $N_U$, may be defined for a day, a shift, an hour or any other time period. A call center administrator may define the time period over which U applies and update $N_U$ with the defined periodicity. Historical data, relating to the particular call center, may be used to determine U. Note that predictive modeling of call rate R can be useful in the context of the present invention, for instance, when defining U or as an enhancement to the sampling of R(t). Note that, rather than being a constant, average call duration D may vary with time and thus a time dependent average call duration D(t) may be sampled, and used when determining the Erlang C value P in the same manner as the time varying call rate R(t) is used.

In a further enhancement to the present invention, in a "bursty" call center environment, if the rate of change of the call rate exceeds a particular threshold, all agents in the blended pool may be assigned to inbound state. This assignment action would bypass agent assignment optimization.

GOS information may be available to agent assignment server 214 (FIG. 2) from call center server 208 (FIG. 2). Although function N(w, R, D, GOS) defines a theoretical number of inbound agents, N, necessary to meet a requirement for GOS and w given R and D, a sampled GOS may differ from the requirement due to real world conditions. In an application for which a high degree of accuracy is desirable, a feedback control model may be employed to improve the performance of call center 102 (FIG. 1). In such a system, the GOS is sampled and, if there is a difference between the sampled GOS and the required GOS, the number of inbound agents is adaptively adjusted to minimize the difference.

A function may be defined as $A_N$(N, w, R, D, GOS, SGOS) where N is the current number of inbound agents and SGOS is the sampled GOS. A difference of Erlang C probabilities, P(w, R, D, N)−P(w, R, D, N+$A_N$), is calculated as $A_N$ is successively stepped up by one. The first adjustment to the number of inbound agents, $A_N$, for which the difference of Erlang C probabilities exceeds a difference in grades of service, SGOS-GOS, is defined to be the solution to the function, $A_N$.

For example, it may be determined, as in the example above, that 92 inbound agents are required to result in a 5% probability that an inbound call is in a queue for longer than six seconds given a call rate R of 10 000 calls per hour and an average call handling time D of 30 seconds. However, if a sampled GOS indicates that there is a 9.5% probability that an inbound call is in a queue for longer than six seconds, then an adjustment may be performed to the number of inbound agents. For these conditions, $A_N$(92, 6, 10 000, 30, 0.05, 0.095)=10, and the number of inbound agents may be increased from 92 to 102.

Other control models can be defined and may be a function of the nature of the call center traffic. Under situations of steady state, feedback control will not be necessary. At the other extreme, continual non-steady state traffic arrival patterns will call for more sophisticated control algorithms. The control algorithm employed will depend on the nature of the call center traffic arrival patterns.

Note that the call rate, as received by agent assignment server 214 through the call center server 208 RTI, may be calculated using more than one technique. The call rate, defined by the number of inbound calls received in a specified time period, may be calculated using an interval-to-date technique. In such a technique, a start time is defined, the number of inbound calls are counted starting from that start time and the specified time period is the amount of time that has passed between that start time and the sampling time. Alternatively, a moving may be used in which the number of inbound calls are totaled for a specified time period ending at the sampling time.

Consider a call arrival distribution such as:

| Start | End | Calls |
|---|---|---|
| 8:00 | 8:01 | 5 |
| 8:01 | 8:02 | 3 |
| 8:02 | 8:03 | 8 |
| 8:03 | 8:04 | 12 |
| 8:04 | 8:05 | 12 |
| 8:05 | 8:06 | 20 |
| 8:06 | 8:07 | 38 |

In the above example, with the start time defined as 8:00 a.m., as of 8:06 a.m. 60 calls have been received in a 6 minute period, and the call rate calculated using the interval-to-date technique is 10 per minute. As of 8:07 a.m., 98 calls have been received in a 7 minute period, and the call rate calculated using an interval-to-date technique is 14 per minute. If the call rate is calculated using a 5-minute moving window technique, the call rate would be determined to be 10 per minute at 8:06 (50 calls in 5 minutes) and 18 calls per minute at 8:07 (90 calls in 5 minutes). As will be apparent to a person skilled in the art, there are still further call rate calculating techniques.

The rate of change of the call rate, dR(t)/dt, may be used to adaptively alter the update interval Δt. On one hand, if the rate of change of the call rate is high, the update interval may be maintained short, while on the other hand, an agent assignment server operating at a time in which there is a low rate of change of the call rate may benefit from a lengthening of the update interval, with a corresponding reduction in processing demand. Note that the function on which adaptive control is based may be generalized to higher orders, i.e. those skilled in the application of feedback control will be able to apply an appropriate control model which may use higher order derivatives. For instance, the second derivative, the rate of change of slopes, may indicate how quickly a burst of calls may occur. Similar adaptive changes may be made to the size of a window in a moving window call rate calculating technique or to the start time of an interval-to-date call rate calculating technique.

In an alternative embodiment of the present invention, agent assignment server 214 (FIG. 2) merely informs call center server 208 (FIG. 2) of the changes in the inbound pool size, ΔN(t+Δt). State reassignment of individual agents is then left to call center server 208 to perform.

As will be apparent to a person skilled in the art, supplying an agent assignment server with real time information is a processor intensive operation for a call center server. Given current processor speeds, a suggested update interval, Δt, is thirty seconds. However, as processors become faster, a shorter update interval may be preferred.

Returning to FIG. 2, although the present invention has been described in conjunction with agent assignment server 214 defined as a component separate from call center server 208, agent assignment server 214 may be incorporated within call center server 208. Alternatively, agent assignment server 214 may be incorporated within one of, or distributed among more than one of, terminals 212A, 212B, 212C . . . 212Z. A terminal with agent assignment capabilities would then be termed a "thick client" as some processing, namely agent assignment, takes place at the terminal.

As will be apparent to a person skilled in the art, a call center may place more importance on outbound calls than inbound calls. Such a call center may, for instance, be directed to canvassing a community for charitable donations. As such, a preferred grade of service for this call center would not be defined in relation to inbound calls, as "probability that an inbound call is in a queue for longer than a specified time period" was above, but instead would be defined in relation to outgoing calls. One possibility for GOS in this case may be specified as "probability that the number of outbound calls placed in a specified time period equals or exceeds a minimum". The preferred state of agents in this case would be outbound rather than inbound.

Other modifications will be apparent to those skilled in the art and, therefore, the invention is defined in the claims.

We claim:

1. For a call center having a pool of agents assigned to an inbound state and a pool of agents assigned to an outbound state, a method of optimizing a size of a pool of agents assigned to a preferred state, where said preferred state is one of said inbound state and said outbound state, said method comprising:

receiving call information comprising a grade of service specification and a call rate;

optimizing, based on said received information, said size of said pool of agents assigned to said preferred state;

determining, based on said optimizing, a change in said size of said pool of agents assigned to said preferred state; and communicating said change.

2. The method of claim 1 further comprising:

receiving agent activity information; and if said change indicates an increase in said size of said pool of agents assigned to said preferred state, reassigning a number of idle ones of said agents assigned to the other state to said preferred state, where said number is equivalent to a magnitude of said change.

3. The method of claim 1 further comprising:

receiving agent activity information; and if said change indicates a decrease in said size of said pool of agents assigned to said preferred state, reassigning a number of idle ones of said agents assigned to said preferred state to the other state, where said number is equivalent to a magnitude of said change.

4. The method of claim 3 wherein said reassigning comprises, for a particular idle one of said agents assigned to said inbound state:

determining a frequency of state reassignment; and reassigning only if said frequency is less than a threshold.

5. The method of claim 1 wherein said preferred state is said inbound state.

6. The method of claim 5 wherein said grade of service comprises a probability that an inbound call will be in a queue for a time longer than a specified time period.

7. The method of claim 6 wherein said received information includes an average call duration.

8. The method of claim 7 wherein said optimizing comprises determining a smallest positive integer number of agents assigned to said inbound state for which an Erlang C probability, determined given said specified time period, said average call duration and said call rate, is equal to or exceeded by said grade of service probability.

9. The method of claim 1 where said communicating is performed once a pre-determined time period and said method further comprises adjusting a length of said pre-determined time period based on a rate of change of said received information.

10. The method of claim 1 where said optimizing comprises determining a theoretical size of said pool of agents assigned to said preferred state to meet said grade of service.

11. The method of claim 1 wherein said received information includes a sampled grade of service and said optimizing further comprises adjusting said theoretical size of said pool of agents assigned to said preferred state based on a difference between said sampled grade of service and said grade of service.

12. A method of initializing a call center comprising:

determining a maximum size of a pool of agents to be assigned to an inbound state given a maximum expected call rate and a grade of service specification;

communicating said maximum size of a pool of agents to be assigned to an inbound state to said call center;

receiving call information from said call center;

optimizing, based on said received information, an initial size of said pool of agents assigned to said inbound state; and communicating said initial size of said pool of agents assigned to said inbound state to said call center.

13. The method of claim 12 further comprising:
determining based on said initial size of said pool of agents assigned to said inbound state and said maximum size of said pool of agents to be assigned to said inbound state, an initial size of a pool of agents assigned to an outbound state; and
communicating said initial size of a pool of agents assigned to an outbound state to said call center.

14. The method of claim 12 further comprising inflating said maximum expected call rate to allow said call center to meet said grade of service specification in the event of an instantaneous call rate exceeding said maximum expected call rate.

15. An agent assignment server comprising:
means for receiving call information from a call center, said call information comprising a grade of service specification and a call rate;
processor means for optimizing, based on said received information, a size of a pool of agents assigned to a preferred state;
processor means for determining, based on said optimizing, a change in said size of said pool of agents assigned to said preferred state; and
means for communicating said change to said call center.

16. An agent assignment server comprising:
a receiver for receiving call information, said call information comprising a grade of service specification and a call rate;
a processor operable to:
optimize, based on said received information, a size of a pool of agents assigned to a preferred state;
determine, based on said optimizing, a change in said size of said pool of agents assigned to said preferred state; and
a network interface for communicating said change.

17. An agent assignment server operable to:
receive call information, said call information comprising a grade of service specification and a call rate;
optimize, based on said received information, a size of a pool of agents assigned to a preferred state;
determine, based on said optimizing, a change in said size of said pool of agents assigned to said preferred state; and
communicate said change.

18. A computer readable medium for providing program control to an agent assignment processor, said computer readable medium adapting said processor to be operable to:
receive call information, said call information comprising a grade of service specification and a call rate;
optimize, based on said received information, a size of a pool of agents assigned to a preferred state;
determine, based on said optimizing, a change in said size of said pool of agents assigned to said preferred state; and
communicate said change.

19. For a call center having a pool of agents assigned to an inbound state and a pool of agents assigned to an outbound state, a method of adjusting a size of a pool of agents assigned to a preferred state, where said preferred state is one of said inbound state and said outbound state, said method comprising:
receiving call information from a call center, wherein said information comprises a call rate and a grade of service specification;
determining, based on said received information, a change in said size of said pool of agents assigned to said preferred state, and wherein said preferred state is said inbound state; and
communicating said change to said call center.

20. The method of claim 19 wherein said grade of service comprises a probability that an inbound call will be in a queue for a time longer than a specified time period.

21. The method of claim 20 wherein said received information includes an average call duration.

22. The method of claim 21 wherein said optimizing comprises determining a smallest positive integer number of agents assigned to said inbound state for which an Erlang C probability, determined given said specified time period, said average call duration and said call rate, is equal to or exceeded by said grade of service probability.

23. A method of initializing a call center comprising:
determining a maximum size of a pool of agents to be assigned to an inbound state given a maximum expected call rate;
communicating said maximum size of a pool of agents to be assigned to an inbound state to said call center;
receiving call information from said call center;
determining, based on said received information, an initial size of said pool of agents assigned to said inbound state;
communicating said initial size of said pool of agents assigned to said inbound state to said call center;
determining, based on said initial size of said pool of agents assigned to said inbound state and said maximum size of said pool of agents to be assigned to said inbound state, an initial size of a pool of agents assigned to an outbound state;
communicating said initial size of a pool of agents assigned to an outbound state to said call center; and
inflating said maximum expected call rate to allow said call center to meet a grade of service specification in the event of an instantaneous call rate exceeding said maximum expected call rate.

\* \* \* \* \*